US012742701B2

(12) United States Patent
Takei et al.

(10) Patent No.: US 12,742,701 B2
(45) Date of Patent: Sep. 22, 2026

(54) INSPECTION APPARATUS AND INSPECTION METHOD

(71) Applicant: HONDA MOTOR CO., LTD., Tokyo (JP)

(72) Inventors: Yasuhito Takei, Wako (JP); Tsutomu Kamiyamaguchi, Wako (JP); Shuji Kawano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 18/771,508

(22) Filed: Jul. 12, 2024

(65) Prior Publication Data

US 2025/0027842 A1 Jan. 23, 2025

(30) Foreign Application Priority Data

Jul. 19, 2023 (JP) ................................ 2023-117703

(51) Int. Cl.
*G01M 13/021* (2019.01)
*G01M 13/028* (2019.01)
*G07C 5/08* (2006.01)

(52) U.S. Cl.
CPC ........ *G01M 13/021* (2013.01); *G01M 13/028* (2013.01); *G07C 5/0816* (2013.01)

(58) Field of Classification Search
CPC .............. G01M 13/021; G01M 13/028; G07C 5/0816; F16H 57/01
See application file for complete search history.

(56) References Cited

U.S. PATENT DOCUMENTS

2015/0345611 A1* 12/2015 Arita ....................... F16H 57/01 73/579
2019/0346822 A1* 11/2019 Jalluri ................ G05B 19/4065
2020/0217751 A1* 7/2020 Sato ......................... G07C 3/14

FOREIGN PATENT DOCUMENTS

JP 2005091232 A * 4/2005

* cited by examiner

*Primary Examiner* — Adam D Tissot
*Assistant Examiner* — Jack R Brewer
(74) *Attorney, Agent, or Firm* — THOMAS | HORSTEMEYER, LLP

(57) ABSTRACT

An inspection apparatus is configured to inspect damage on gears in a transmission that transmits a torque generated by a motor mounted as a drive source of a vehicle. The inspection apparatus comprising: a sensor configured to detect an AE signal in a meshing state of the gears; and a processor configured to determine presence or absence of occurrence of damage in the meshing state of the gears based on the AE signal.

8 Claims, 9 Drawing Sheets

FIG. 3

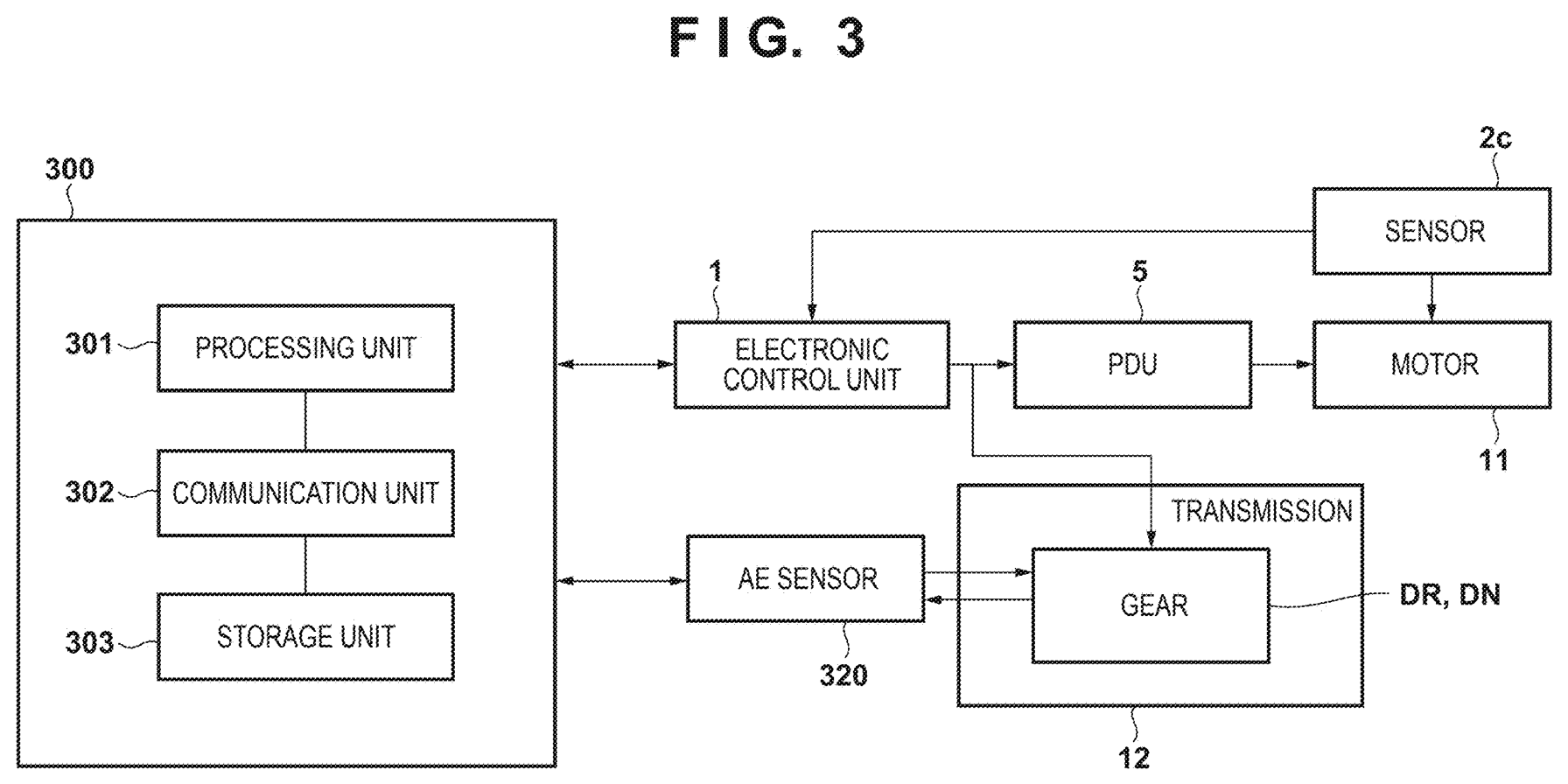

SENSOR 2c
MOTOR 11
TRANSMISSION
GEAR
DR, DN
12
PDU 5
ELECTRONIC CONTROL UNIT 1
AE SENSOR 320
300
PROCESSING UNIT 301
COMMUNICATION UNIT 302
STORAGE UNIT 303

FIG. 4
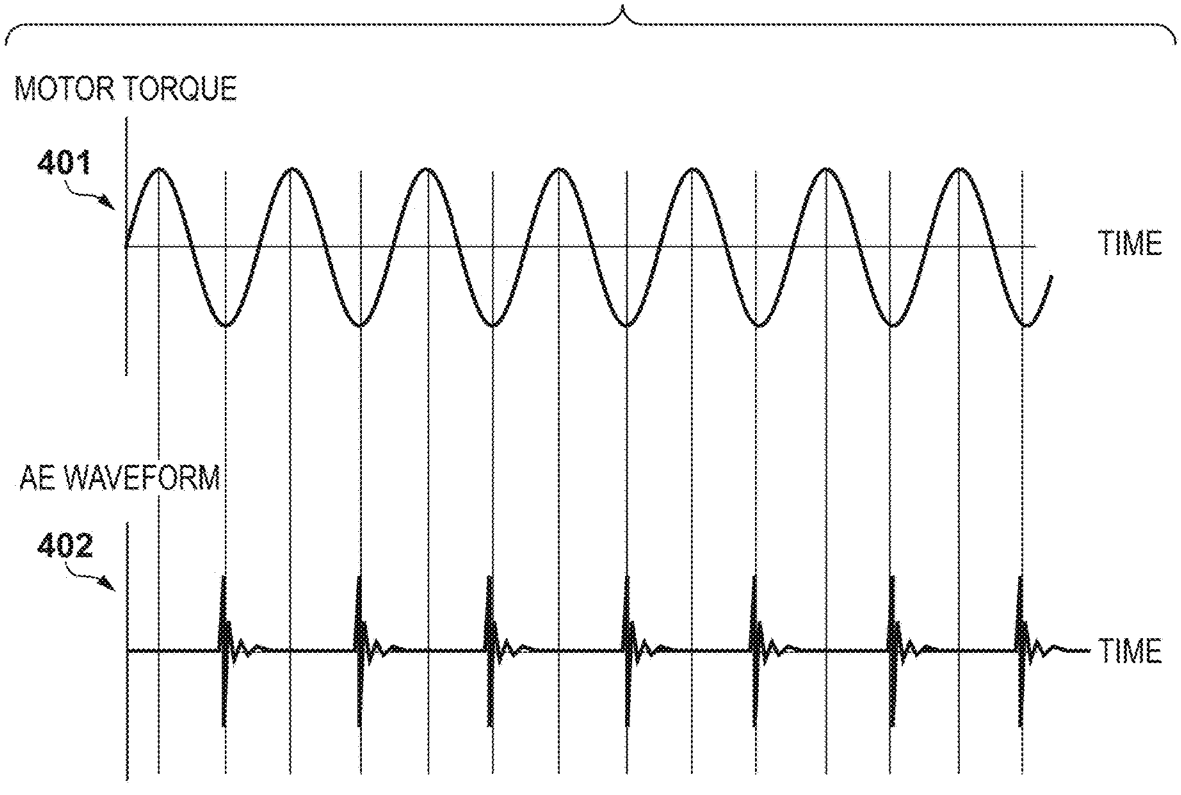
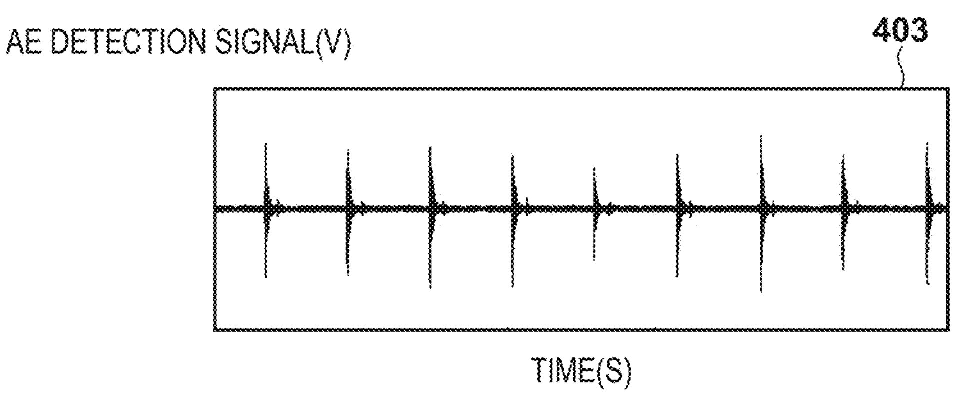
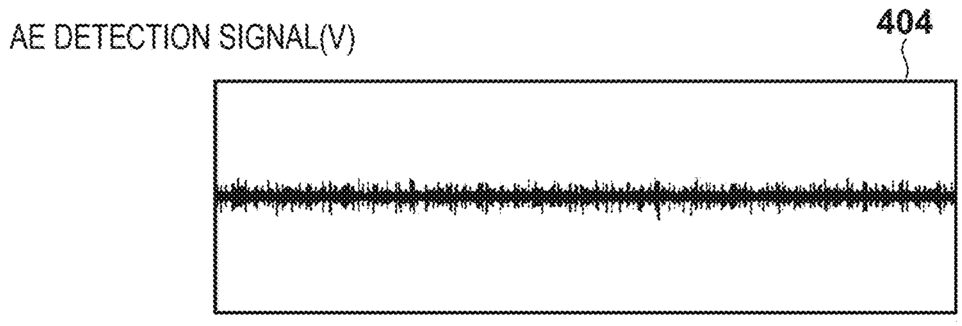

|  |  |  |  |  |  |  |  |  |  |  |  |  |  |  |  |  |
|---|---|---|---|---|---|---|---|---|---|---|---|---|---|---|---|---|
| DR | 1 | 2 | 3 | 1 | 2 | 3 | 1 | 2 | 3 | 1 | 2 | 3 | 1 | 2 | 3 | 1 |
| DN | 1 | 2 | 3 | 4 | 5 | 1 | 2 | 3 | 4 | 5 | 1 | 2 | 3 | 4 | 5 | 1 |

| ITEM |  | SPECIFICATION VALUE |  |
|---|---|---|---|
| GEAR MESH | DR NUMBER OF TEETH | DR1 | RATIO DR1/DN1 |
|  | DN NUMBER OF TEETH | DN1 |  |
| GEAR MESH | DR NUMBER OF TEETH | DR2 | RATIO DR2/DN2 |
|  | DN NUMBER OF TEETH | DN2 |  |

NON-INSPECTION PERIOD

EXAMINATION DATE PERFORMED AT LAST

CURRENT TIME

TIME

| INSPECTION DATE AND TIME INFORMATION | | | | | | | | | | | | | | | | | |
|---|---|---|---|---|---|---|---|---|---|---|---|---|---|---|---|---|---|
| DR | | | | | | | | | 1 | | | | | | | | |
| DN | 1 | 2 | 3 | 4 | 5 | 6 | 7 | 8 | 9 | 10 | 11 | 12 | 13 | 14 | 15 | 16 | 17 |

CURRENT POSITION
701
DR1-DN1
PLANNED STOP POSITION
702
705
TARGET STOP POSITION
DR8-DN48
UPDATED STOP POSITION
703
706
UPDATED STOP
TARGET POSITION
DR10-DN50
PREDETERMINED RANGE
704
705
706
INSPECTION
DATE AND TIME
INFORMATION
DR
DN
CORRECTION AMOUNT
DR: 1 2 3 4 5 6 7 8 9 10 11 12 13 14 15 16 17
DN: 41 42 43 44 45 46 47 48 49 50 51 52 53 54 55 56 57
CORRECTION AMOUNT: -0.07 -0.06 -0.05 -0.04 -0.03 -0.02 -0.01 0 0.01 0.02 0.03 0.04 0.05 0.06 0.07 0.08 0.09

INSPECTION APPARATUS AND INSPECTION METHOD

This application claims priority to and the benefit of Japanese Patent Application No. 2023-117703 filed on Jul. 19, 2023, the entire disclosure of which is incorporated herein by reference.

BACKGROUND OF THE INVENTION

Field of the Invention

The present invention relates to an inspection apparatus and an inspection method.

Description of the Related Art

Japanese Patent Laid-Open No. 2005-91232 discloses a technique of detecting vibration of a rotary shaft and a rotation angle of the rotary shaft while rotating the rotary shaft to mesh gears in a plurality of stages, and detecting presence or absence of a dent and a position where the dent occurs in the gears from a vibration detection waveform and a detection value of the rotation angle.

In an electric vehicle, it is preferable to inspect presence or absence of occurrence of damage in a meshing state of gears in a state where a motor is mounted on the vehicle, but there is a concern about the stability of the vehicle because the inspection is performed during traveling.

In view of the above problem, the present invention provides an inspection technique capable of inspecting presence or absence of occurrence of damage in a meshing state of gears in a state where a motor is mounted on a vehicle.

SUMMARY OF THE INVENTION

According to one aspect of the present invention, there is provided an inspection apparatus configured to inspect damage on gears in a transmission that transmits a torque generated by a motor mounted as a drive source of a vehicle, the inspection apparatus comprising: a sensor configured to detect an AE signal in a meshing state of the gears; and a processor configured to determine presence or absence of occurrence of damage in the meshing state of the gears based on the AE signal.

According to another aspect of the present invention, there is provided an inspection method of an inspection apparatus, configured to inspect damage of gears in a transmission that transmits a torque generated by a motor mounted as a drive source of a vehicle, the inspection method comprising: detecting, by a sensor of the inspection apparatus, an AE signal in a meshing state of the gears; and determining, by a processor of the inspection apparatus, presence or absence of occurrence of damage in the meshing state of the gears based on the AE signal.

According to the present invention, it is possible to inspect presence or absence of occurrence of damage in the meshing state of the gears in the state where the motor is mounted on the vehicle.

BRIEF DESCRIPTION OF THE DRAWINGS

FIG. 3 is a diagram illustrating functional configurations of an inspection apparatus of the embodiment;

FIG. 4 is a view for illustratively describing a signal waveform of an AE sensor;

FIG. 6 is a view illustrating an example of inspection date and time information accumulated in a storage unit;

DESCRIPTION OF THE EMBODIMENTS

Figure 1:
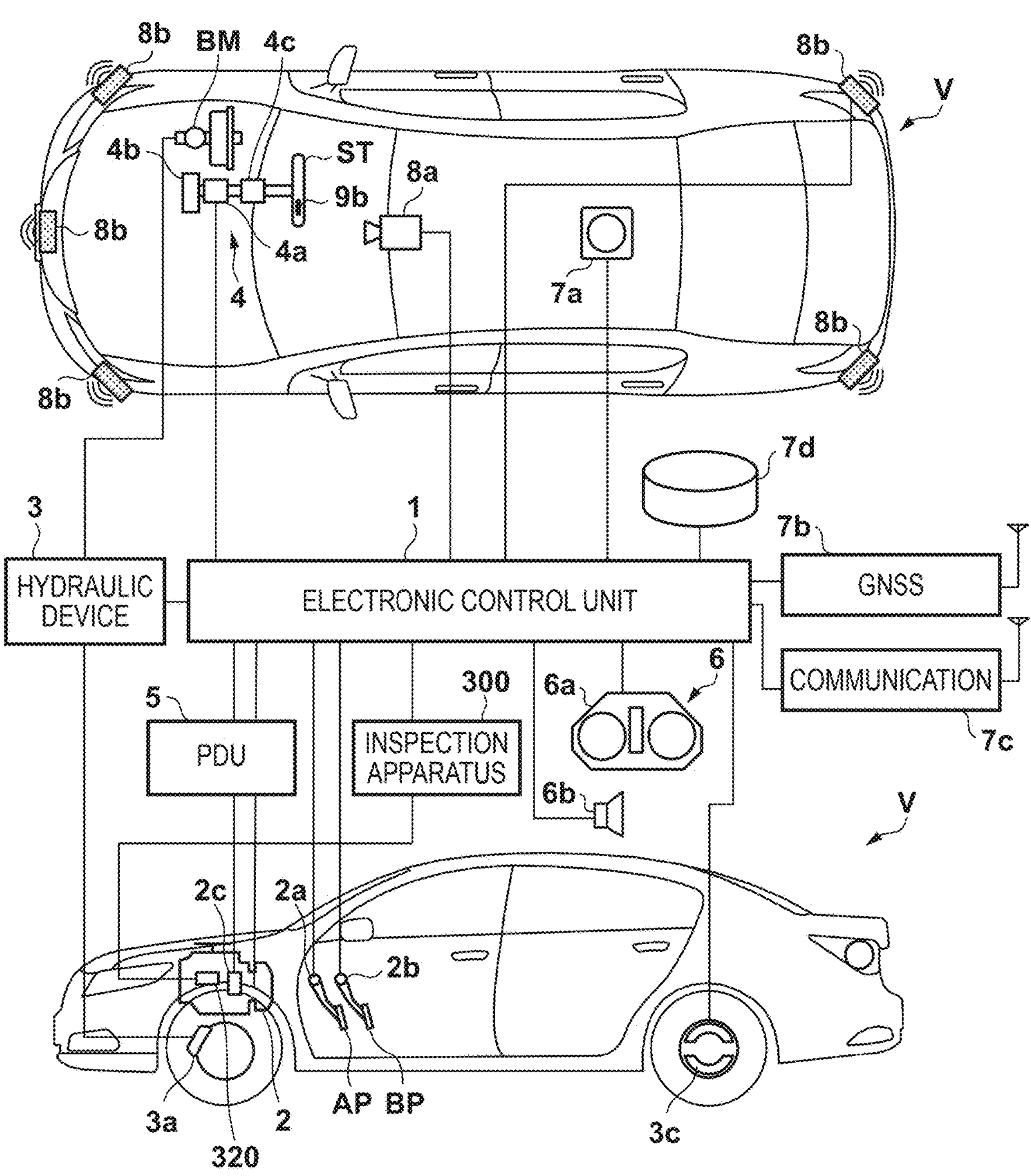
FIG. 1 is a block diagram of a vehicle and a control device according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Outline of Automated Driving Vehicle>

A vehicle V (automated driving vehicle) of the present embodiment is, for example, a four-wheeled electric vehicle, and an outline of the vehicle Vis illustrated in a plan view and a side view in FIG. 1. An electronic control unit (ECU) 1 of the present embodiment controls a hydraulic device 3, a motor 11, a transmission 12, various sensors **8*a* and 8*b*, and the like. The electronic control unit 1 is not only configured as one unit, but may be configured by a plurality of ECUs such as an ECU for controlling the motor 11 and an ECU for controlling the transmission 12**.

The electronic control unit 1 includes a processor represented by a central processing unit (CPU), a storage device such as a semiconductor memory, an interface with an external device, and the like. The storage device stores a program to be executed by the processor, data used for processing by the processor, and the like. The interface includes an input and output interface, and a communication interface.

The electronic control unit 1 controls driving (acceleration) of the vehicle V by controlling a power unit 2. The power unit 2 is a travel driving unit that outputs a driving force for rotating driving wheels of the vehicle V, and can include a motor 11 and a transmission 12. The motor 11 can be used as a drive source for accelerating the vehicle V, and can also be used as a generator at the time of deceleration or the like (regenerative braking).

A power drive unit (PDU) 5 is a device that performs rotation control and stop control of the motor 11. The electronic control unit 1 generates a control signal for controlling the motor 11 and outputs the control signal to the PDU 5. The PDU 5 can perform the rotation control and stop control of the motor 11 based on the control signal acquired from the electronic control unit 1. As automated driving control of the vehicle V, the electronic control unit 1 can perform, for example, the stop control for stopping the vehicle V at a target stop position, acceleration or deceleration control for controlling acceleration or deceleration of the vehicle V, lane keeping control, lane change control, and the like.

The electronic control unit 1 controls the output of the motor 11 or switches a gear ratio of the transmission 12 in accordance with a driver's driving operation or a vehicle speed detected by an operation detection sensor 2*a* provided on an accelerator pedal AP or an operation detection sensor 2*b* provided on a brake pedal BP. Note that the motor 11 is provided with a sensor 2*c* that detects a rotation angle and a rotation speed of an output shaft of the motor 11 as a sensor that detects a traveling state of the vehicle V. The vehicle speed of the vehicle V can be calculated from a result of detection by the sensor 2*c*.

The electronic control unit 1 controls braking (deceleration) of the vehicle V by controlling a hydraulic device 3. The hydraulic device 3 is an actuator capable of controlling the hydraulic pressure of hydraulic oil supplied to a brake device 3*a* (for example, a disc brake device) provided on each of four wheels, based on the hydraulic pressure transmitted from a brake master cylinder BM. The electronic control unit 1 can control braking of the vehicle V by performing drive control of an electromagnetic valve or the like included in the hydraulic device 3, and can perform the stop control for stopping the vehicle V at a predetermined target position.

The electronic control unit 1 controls steering of the vehicle V by controlling an electric power steering device 4. The electric power steering device 4 includes a mechanism for steering front wheels in response to a driver's driving operation (steering operation) on a steering wheel ST. The electric power steering device 4 includes a drive unit 4*a* including a motor that exerts a driving force for assisting a steering operation or automatically steering the front wheels, a steering angle sensor 4*b*, a torque sensor 4*c* that detects a steering torque borne by the driver, and the like.

The electronic control unit 1 brings the vehicle V into a stopped state by controlling a parking gear 50 and a parking pawl 51 of the transmission 12 and controlling an electric parking brake device 3*c* provided on a rear wheel.

The electronic control unit 1 performs driving assistance or automated driving of the vehicle V, based on detection results of various detection units provided in the vehicle V. The vehicle Vis provided with surroundings detection units 8*a* and 8*b* that are external sensors that detect the outside (surrounding situation) of the vehicle V. The electronic control unit 1 grasps the surrounding situation of the vehicle V, based on detection results of the surroundings detection units 8*a* and 8*b*, and is capable of performing the automated driving assistance in accordance with the surrounding situation. The surroundings detection unit 8*a* is an imaging device (front camera 8*a*) that captures an image of the front of the vehicle V, and the electronic control unit 1 can extract a contour of a target object and a lane division line (white line or the like) on a road by analyzing the image captured by the front camera 8*a*.

The surroundings detection unit 8*b* is a millimeter wave radar (which may be referred to as a radar 8*b*), detects a target object around the vehicle V using radio waves, and detects (measures) a distance to the target object and a direction (azimuth) of the target object with respect to the vehicle V. Note that the surroundings detection units provided in the vehicle V are not limited to the above configurations, and a light detection and ranging (LiDAR) for detecting a target object around the vehicle V may be provided.

The electronic control unit 1 recognizes and determines a current position and a course (attitude) of the vehicle V. In the present embodiment, the vehicle V includes a gyro sensor 7*a*, a global navigation satellite system (GNSS) sensor 7*b*, and a communication device 7*c*. The gyro sensor 7*a* detects a rotational motion (yaw rate) of the vehicle V. The GNSS sensor 7*b* detects a current position of the vehicle V. Further, the communication device 7*c* performs wireless communication with an external device or an inspection apparatus to transmit and receive various types of information. Information acquired from the gyro sensor 7*a*, the GNSS sensor 7*b*, and the communication device 7*c* is stored in a database 7*d* (storage device). In the case of the present embodiment, the electronic control unit 1 can perform control to identify the current position of the vehicle V, determine the course of the vehicle V based on detection results of the gyro sensor 7*a* and the GNSS sensor 7*b*, and stop the vehicle V at a target position.

The electronic control unit 1 controls an information output device 6 that issues various notifications. The information output device 6 includes, for example, an information display device 6*a* that notifies (displays) the driver of information by an image, and/or an audio output device 6*b*, for example, a speaker or the like that notifies the driver of information by a voice. The information display device 6*a* may be, for example, an indicator that can be provided on an instrument panel.

<Outline of Power Unit>

Figure 2:
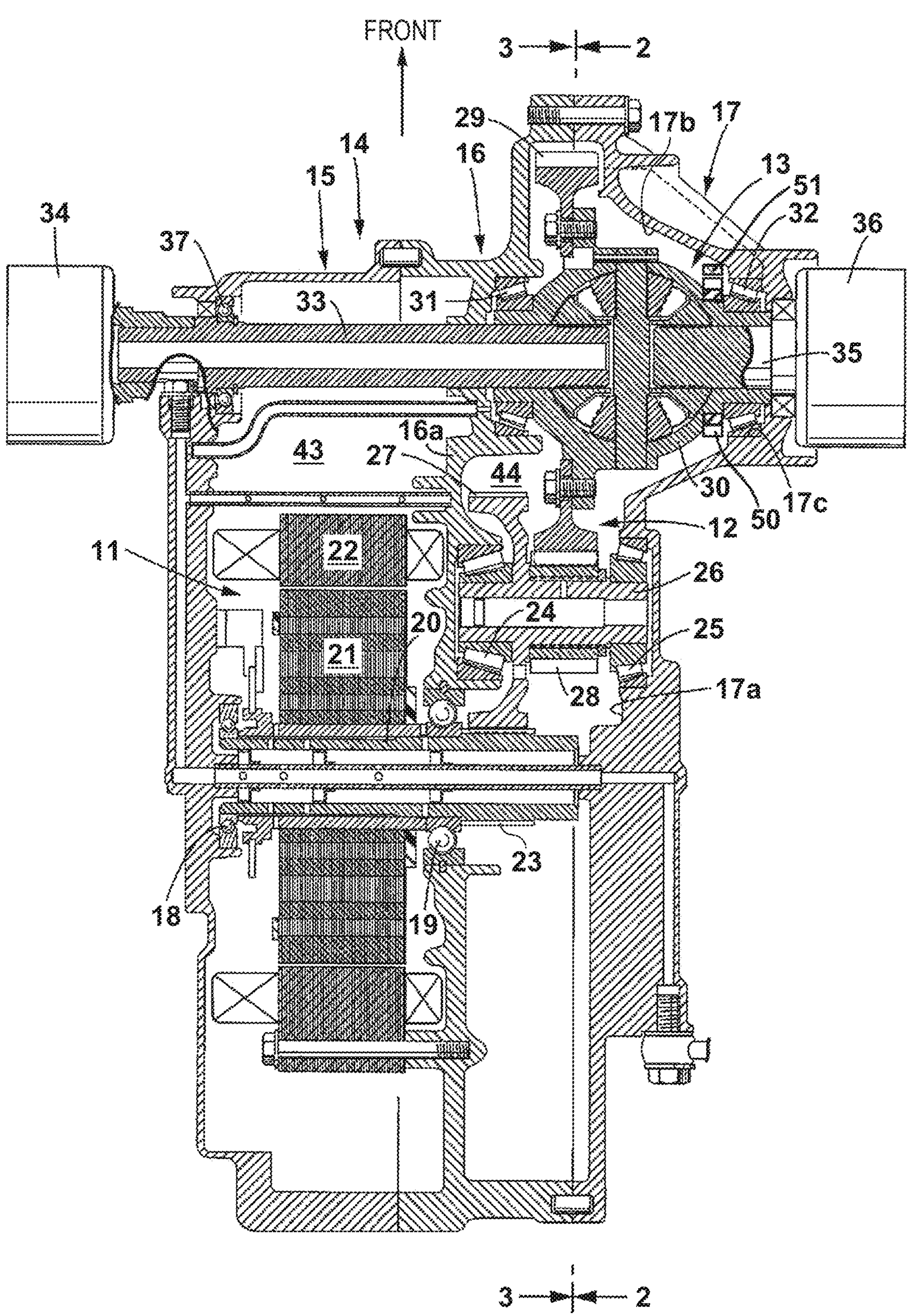
FIG. 2 is a view illustrating a configuration example of a power unit of the vehicle according to the embodiment.

As illustrated in FIG. 2, the power unit of the vehicle V includes a housing 14 that houses the motor 11, the transmission 12, and a differential gear 13 therein, and the housing 14 includes a left housing 15, a central housing 16, and a right housing 17 divided into three parts in the vehicle width direction. A first accommodating portion 43 is defined between the left housing 15 and the central housing 16, and a second accommodating portion 44 is defined between the central housing 16 and the right housing 17.

The motor 11 disposed in the first accommodating portion 43 includes a motor shaft 20 supported by the left housing 15 and the central housing 16 via ball bearings 18 and 19, respectively, interposed therebetween, a rotor 21 fixed to the motor shaft 20, and a stator 22 fixed to the central housing 16 so as to surround the outer periphery of the rotor 21. Oil is stored in a bottom portion of the housing 14.

The transmission 12 disposed in the second accommodating portion 44 includes a first reduction gear 23 (first drive gear) fixed to a distal end of the motor shaft 20 protruding rightward from the right housing 17. Further, the transmission 12 includes a reduction shaft 26 supported by the central housing 16 and the right housing 17 via angular roller bearings 24 and 25, respectively, interposed therebetween, and a second reduction gear 27 (first driven gear) that is fixed to the reduction shaft 26 and meshes with the first reduction gear 23. Further, the transmission 12 includes a final drive gear 28 (second drive gear) fixed to the reduction shaft 26 and a final driven gear 29 (second driven gear) fixed to the outer periphery of the differential gear 13 and meshes with the final drive gear 28.

A differential case 30 constituting an outer shell of the differential gear 13 disposed in the second accommodating portion 44 is supported by the central housing 16 and the right housing 17 with angular roller bearings 31 and 32, respectively, interposed therebetween, an inboard joint 34 provided at a distal end of a left output shaft 33 that is long and extends in the left direction from the differential case 30 protrudes outward from the left housing 15, and an inboard joint 36 provided at a distal end of a right output shaft 35 that is short and extends in the right direction from the differential case 30 protrudes outward from the right housing 17. The inboard joint 34 on the left side is connected to a left rear wheel via a left half shaft (not illustrated), and the inboard joint 36 on the right side is connected to a right rear wheel via a right half shaft (not illustrated). A left end of the left output shaft 33 whose right end is supported by the differential gear 13 is supported by the left housing 15 with a ball bearing 37 interposed therebetween. The parking gear 50 is fixed to the right output shaft 35, and the parking pawl 51 is attached to the right housing 17. A recess and a protrusion are alternately formed in the circumferential direction on an outer peripheral surface of the parking gear 50. The parking pawl 51 includes a claw portion engageable with the recess of the parking gear 50. At the time of parking, the recess of the parking gear 50 is engaged with the claw portion of the parking pawl 51 attached to the right housing 17, thereby entering a locked state in which the parking gear 50 is not rotatable.

<Functional Configuration of Inspection Apparatus 300>

FIG. 3 is a diagram illustrating functional configurations of an inspection apparatus 300 of the present embodiment. The inspection apparatus 300 includes a processing unit 301, a communication unit 302, and a storage unit 303. The processing unit 301 is a processor represented by a CPU, and executes a program stored in the storage unit 303 to process a signal detected by an AE sensor 320. The storage unit 303 is a storage device (memory) such as a read-only memory (ROM), a random-access memory (RAM), or a hard disk drive (HDD), and stores various types of control information and history information (inspection date and time information) obtained by processing the signal detected by the AE sensor 320, in addition to the program executed by the processing unit 301. The communication unit 302 is a communication device that communicates with other external devices or the like. The processing unit 301 communicates with the electronic control unit 1 via the communication unit 302.

Functional configurations of the processing unit 301 are realized by reading a predetermined computer program stored in the storage unit 303 into the RAM and executing processing by the CPU of the inspection apparatus 300. The functional configurations may be configured by an integrated circuit or the like as long as similar functions can be implemented.

The AE sensor 320 is a sensor that detects a specific vibration (AE signal). The term "AE" is an abbreviation for "Acoustic Emission", and the AE sensor 320 detects vibration (AE signal) in which sound generated when a part of an object is deformed or broken or when impact is applied is emitted as an acoustic wave (elastic wave). The AE signal is likely to be generated due to minor degradation that occurs before the object is completely broken, and thus, enables detection of an initial stage of degradation of the object. A frequency of the vibration (AE signal) is an acoustic wave (elastic wave) as determined by a type of metal, and when pitching, peeling, or cracking occurs in a gear, an abrupt waveform in which a discontinuous and large change instantaneously occurs in the waveform of the vibration occurs. In the present embodiment, the AE sensor 320 is used for a non-destructive inspection of gears (DR and DN) in the transmission 12. The gears (DR and DN) in the transmission 12 include a combination of the first reduction gear 23 and the second reduction gear 27 and a combination of the final drive gear 28 and the final driven gear 29. The inspection apparatus 300 of the present embodiment detects presence or absence of occurrence of pitching, peeling, or cracking in the gears (DR and DN) as a defect (damage) in the gears. Here, the pitching in the gears refers to damage in which a micro-hole is generated on a tooth surface due to fatigue fracture of a material, and the peeling refers to damage in which the material falls off from the tooth surface. Further, the cracking refers to damage in which a crack is generated in the gears or the generated crack propagates (develops).

The AE sensor 320 is provided on a side surface of the housing 14 of the power unit. A signal detected by the AE sensor 320 is input to the inspection apparatus 300, and the processing unit 301 of the inspection apparatus 300 processes the signal detected by the AE sensor 320 and determines the presence or absence of occurrence of damage (pitching, peeling, or cracking) in the gears (DR and DN).

The inspection apparatus 300 applies a torque to the gears (DR and DN) and grasps states of the gears (DR and DN) by the load. When the states are grasped while the vehicle is traveling, there is a possibility that a torque due to the intervention of the driver is added, and thus, there may be a case where an inspection condition varies so that it is difficult to stably estimate the states. Therefore, in order to perform an inspection under a stable condition, the inspection apparatus 300 (inspection unit) inspects the gears (DR and DN) when the vehicle V is stopped in the present embodiment. When the vehicle Vis stopped, the inspection apparatus 300 detects the presence or absence of occurrence of damage (pitching, peeling, or cracking) in the gears (DR and DN) as the defect (damage) in the gears.

When the inspection is performed in the stopped state, meshing of teeth of the gears (DR and DN) as a target of the inspection may be several teeth. For this reason, the inspection apparatus 300 of the present embodiment provides a technique capable of controlling a stop position of the vehicle V in cooperation with automated driving control of the vehicle V, preferentially inspecting meshing of gears having the longest non-inspection period from a previous inspection time point to detect damage in the gears early.

If the inspection is not performed for a long period of time, there is a high possibility that damage (pitching, peeling, or cracking) of a gear occurs in a non-inspection period. Therefore, the inspection is performed with priority given to meshing of the gears (DR and DN) having the longest non-inspection period as a temporal period in which the inspection is not performed.

When the vehicle V stops, the inspection apparatus 300 generates a predetermined torque (for example, a sinusoidal torque) in the motor 11, which is the drive source, and acquires the vibration (AE signal) generated during meshing of the gears (DR and DN) from the AE sensor 320. When the inspection apparatus 300 receives a signal indicating that the motor 11 is stopped from the electronic control unit 1, the processing unit 301 of the inspection apparatus 300 outputs a drive request signal for causing the motor 11 to generate the predetermined torque. The electronic control unit 1 outputs the drive request signal received from the processing unit 301 to the PDU 5, and causes the motor 11 to generate the predetermined torque.

Example of AE Signal Waveform

FIG. 4 is a view for illustratively describing a signal waveform of the AE sensor 320. A torque waveform 401 exemplifies a waveform of a torque generated by the motor 11 based on a drive request signal, and FIG. 4 illustrates an example of a sinusoidal torque.

Further, an AE waveform 402 exemplifies a waveform of vibration (AE signal) detected by the AE sensor 320 during meshing of the gears (DR and DN) due to application of the torque from the motor 11. The processing unit 301 generates the drive request signal for generating the sinusoidal torque having preset cycle and amplitude as a predetermined torque in a stopped state of the vehicle V, and brings the gears into a meshing state.

The processing unit 301 of the inspection apparatus 300 acquires a detection signal of the AE sensor 320 when the torque is generated in the motor 11 based on the drive request signal. The processing unit 301 determines presence or absence of occurrence of damage in the meshing of the gears (DR and DN) based on the waveform of the AE signal. The processing unit 301 determines whether an abrupt signal 403 as illustrated in FIG. 4 is generated in the meshing of the gears (DR and DN) as an inspection target. In a case where the abrupt signal 403 is detected, the processing unit 301 determines that peeling or cracking has occurred in the meshing of the gears. The processing unit 301 outputs a notification signal to issue a notification about the occurrence of peeling or cracking.

On the other hand, in a case where no peeling or crack occurs in the gears, for example, a continuous high-frequency signal 404 is output from the AE sensor 320. When the continuous high-frequency signal 404 is detected by the AE sensor 320, the processing unit 301 determines that no peeling or crack occurs in the gears (DR and DN).

Figure 5:
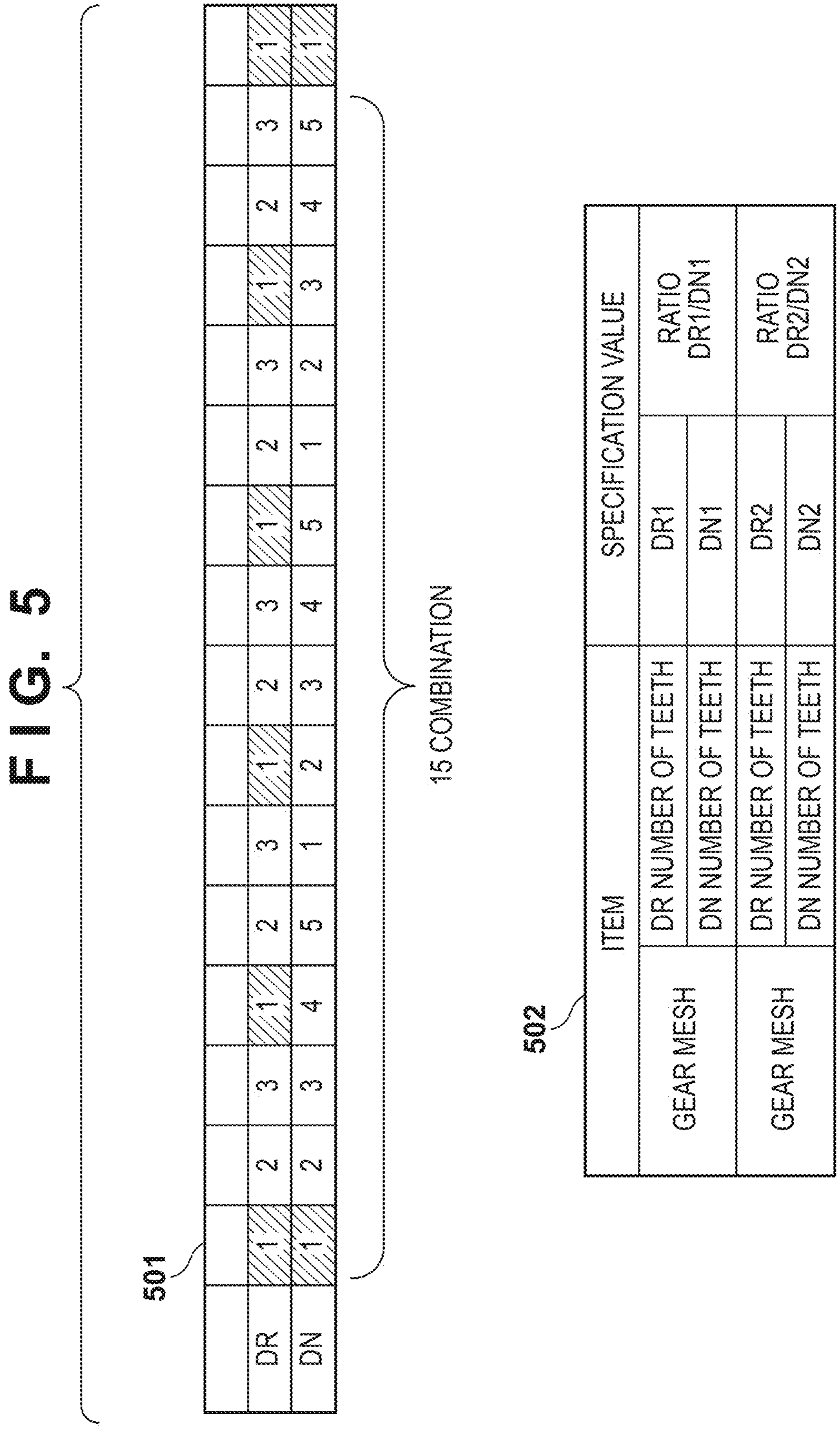
FIG. 5 is a view for illustratively describing meshing of gears (DR and DN)

FIG. 5 is a view for illustratively describing a meshing pattern of the gears (DR and DN). In a meshing pattern 501, a meshing combination in a case where the number of teeth of a drive-side gear DR is set to 3 and the number of teeth of a driven-side gear DN is set to 5 is illustrated for the sake of simplicity. The meshing combination has 15 (=3×5) patterns.

In normal gear design, gears are designed such that a tooth number ratio does not become an integral multiple in order to suppress wear caused by meshing of the same combination.

In meshing of gears illustrated by the power unit in FIG. 2, a ratio (DR1/DN1) is designed not to be an integral multiple (for example, 502 in FIG. 5) where DR1 is the number of teeth of the first reduction gear 23 (first drive gear: DR) and DN1 is the number of teeth of the second reduction gear 27 (first driven gear: DN). Further, a ratio (DR2/DN2) is designed not to be an integral multiple (for example, 502 in FIG. 5) where DR2 is the number of teeth of the final drive gear 28 (second drive gear: DR) and DN2 is the number of teeth of the final driven gear 29 (second driven gear: DN). Specification values of the gears (DR and DN) are stored in the database **7*d* (storage device), and the electronic control unit 1 can acquire meshing information of the gears (DR and DN) with reference to information in the database 7*d*** in stop control of the vehicle V.

<Accumulation of Inspection Date and Time Information>

The inspection apparatus 300 monitors (inspects) a meshing combination of gears, and accumulates inspection date and time information including the date when an inspection is performed, as inspection history information, in the storage unit 303. In the inspection date and time information, the processing unit 301 identifies meshing of gears having the longest non-inspection period from a previous inspection time point as a target of the inspection.

FIG. 6 is a view illustrating an example of the inspection date and time information accumulated in the storage unit 303. Here, as an example, an accumulation example 601 of the inspection date and time information in meshing between a tooth "1" of a drive-side gear DR and teeth "1 to 17" of a driven-side gear DN is illustrated. In the accumulation example 601 of the inspection date and time information, the vertical axis indicates a time axis, and an upper end of the accumulation example 601 indicates reference time (for example, current time). An upper end of a bar graph in each meshing indicates inspection date and time information of an inspection performed last using the AE sensor 320. A gap between the reference time (current time) and the upper end of the bar graph indicates a non-inspection period in the meshing of the gears (DR and DN).

In the accumulation example 601 illustrated in FIG. 6, a combination of the tooth "1" of the drive-side gear DR and the tooth "9" of the driven-side gear DN is meshing of the gears having the longest non-inspection period. As indicated in a non-inspection period 602, the inspection apparatus 300 controls a stop position of the vehicle V in cooperation with automated driving control of the vehicle V such that the combination of the tooth "1" of the drive-side gear DR and the tooth "9" of the driven-side gear DN can be preferentially inspected.

Update Example of Stop Position

Figure 7:
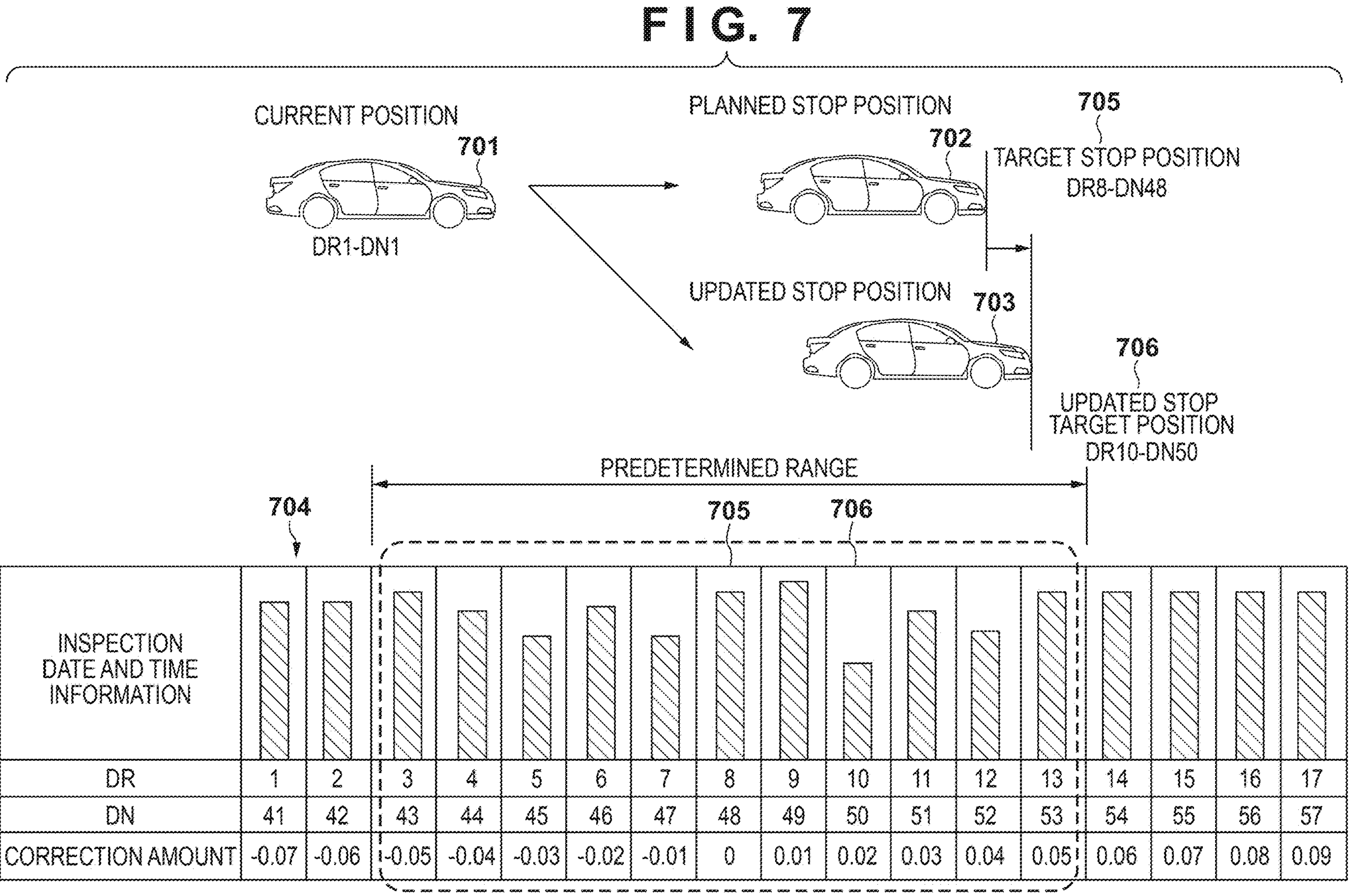
FIG. 7 is a view for describing a processing example of controlling a stop position of the vehicle in order to inspect a gear having a longest non-inspection period.

FIG. 7 is a view for describing a processing example of controlling a stop position of the vehicle V in order to preferentially inspect meshing of gears having the longest non-inspection period. For example, a meshing state of the tooth "1" of a drive-side gear DR and the tooth "1" of a driven-side gear DN at a current position is assumed. When the vehicle travels from this state to a planned stop position (target stop position) in accordance with a travel plan for automated driving as a base, a tooth "8" of the drive-side gear DR and a tooth "48" of the driven-side gear DN mesh with each other.

The inspection apparatus 300 of the present embodiment acquires inspection date and time information accumulated in the storage unit 303 with respect to a meshing combination at the target stop position. Since meshing of the gears that can be inspected in a stopped state of the vehicle Vis several teeth, the inspection date and time information in a predetermined range is acquired with the meshing combination (meshing position) at the target stop position as a reference, and a meshing combination of the gears having the longest non-inspection period is identified. Here, the predetermined range includes, for example, inspection date and time information regarding meshing of several front and rear teeth of the reference meshing position. An acquisition example 704 of the inspection date and time information in FIG. 7 illustrates an example in which inspection date and time information regarding meshing of five teeth each before and after a meshing combination at a target stop position 705 as a reference is acquired. In the acquisition example 704 of FIG. 7, the processing unit 301 identifies meshing of a tooth "10" of the drive-side gear DR and a tooth "50" of the driven-side gear DN as a meshing combination of the gears having the longest non-inspection period in the acquired inspection date and time information in the predetermined range. The processing unit 301 updates the target stop position 705 planned in automated driving control of the vehicle V to a stop target position 706 such that the vehicle V stops at the meshing position of the gears as an inspection target.

When the meshing combination of the gears having the longest non-inspection period is identified, the processing unit 301 transmits a request (inspection request) for performing an inspection at the identified meshing combination to the electronic control unit 1. The processing unit 301 can perform mutual communication with the electronic control unit 1 via the communication unit 302, and the processing unit 301 receives a signal of a determination result of permission or non-permission for the transmitted inspection request via the communication unit 302.

The electronic control unit 1 determines whether the vehicle V can be stopped at the meshing combination in the inspection request. When it is determined that the vehicle V can be stopped based on the inspection request, the electronic control unit 1 updates the target stop position to a stop position based on the inspection request, and performs stop control of the vehicle V. That is, the electronic control unit 1 controls the motor 11 so as to stop the vehicle V at the updated stop position based on the meshing combination identified by the inspection apparatus 300. In the acquisition example 704 of FIG. 7, a correction amount illustratively indicates a numerical value of a relative change in the stop position with respect to the reference target stop position. The unit of the numerical value may be meters or centimeters as a numerical value determined by gear specifications.

<Flow of Processing>

Figure 8:
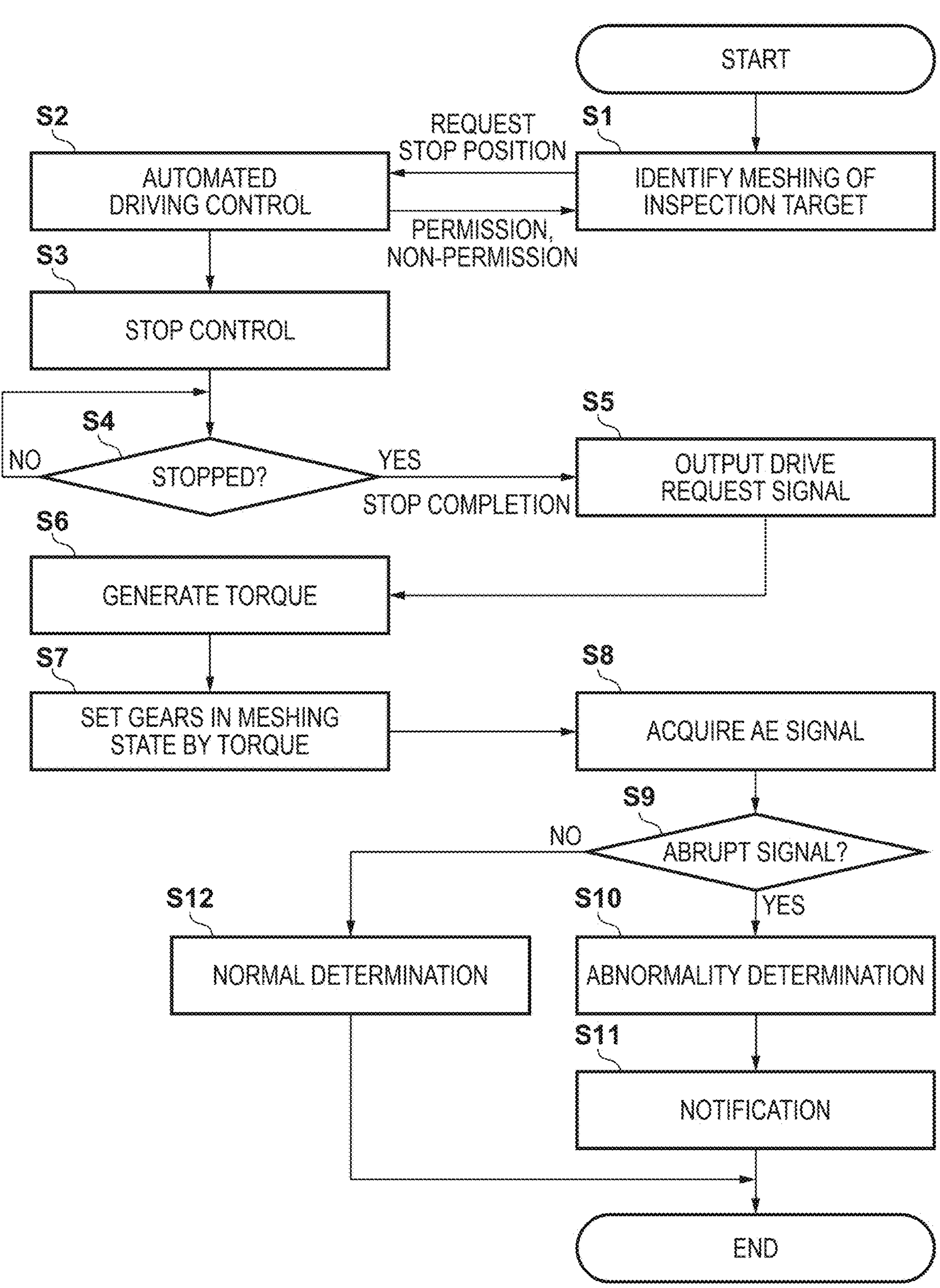
FIG. 8 is a view for describing a flow of processing in the inspection apparatus and an electronic control unit.

A flow of processing in the inspection apparatus 300 and the electronic control unit 1 will be described with reference to a flowchart of FIG. 8. In S1, the processing unit 301 of the inspection apparatus 300 acquires, from the electronic control unit 1, meshing information of gears (DR and DN) during traveling to a stop position (target stop position: for example, 705 in FIG. 7) planned in automated driving control. Here, the meshing information includes not only a meshing position of the gears (DR and DN) but also a meshing range of several front and rear teeth of the meshing position as a reference. The processing unit 301 identifies the meshing position as an inspection target based on the acquired meshing information, and sets a stop target position (for example, 706 in FIG. 7) for performing an inspection based on the meshing information. Then, the processing unit 301 transmits a stop position request (inspection request) for stopping the vehicle V at the set stop target position 706 to the electronic control unit 1.

In S2, the electronic control unit 1 determines whether to permit or not to permit the vehicle V to stop based on the stop position request (inspection request) with the updated target stop position. The electronic control unit 1 determines permission when the stop position request (inspection request) can be permitted based on detection information around the vehicle V, and determines non-permission when the stop position request (inspection request) cannot be permitted.

The electronic control unit 1 transmits a result of the determination to the processing unit 301. The processing unit 301 can identify whether the vehicle V stops at the target stop position before the update or stops at the updated target stop position based on a received signal of the result of determination regarding permission or non-permission.

In S3, the electronic control unit 1 generates a control signal for controlling the motor 11 and outputs the control signal to the PDU 5. The PDU 5 performs rotation control and stop control of the motor 11 based on the control signal acquired from the electronic control unit 1.

When the determination result is non-permission, the electronic control unit 1 generates a control signal for controlling the motor 11 to stop at the target stop position before the update. When the determination result is permission, the electronic control unit 1 generates a control signal for controlling the motor 11 so as to stop at the updated target stop position. The power drive unit (PDU) 5 outputs the generated control signal to the motor 11. When the stop control of the motor 11 is completed, the PDU 5 outputs a stop signal indicating a stopped state of the motor 11 to the electronic control unit 1.

The electronic control unit 1 determines whether the motor 11 is stopped based on presence or absence of the stop signal output from the PDU 5, and continues monitoring of the stop determination of the motor 11 in a case where the motor 11 is not stopped (S4—NO). On the other hand, in a case where the motor 11 is stopped in the determination of S4 (S4—YES), a signal for informing about the stop completion is transmitted to the inspection apparatus 300.

In S5, when the inspection apparatus 300 receives the signal for informing the stop completion from the electronic control unit 1, the processing unit 301 of the inspection apparatus 300 generates a drive request signal for applying a predetermined torque to the motor 11, and outputs the drive request signal to the electronic control unit 1. The processing unit 301 generates the drive request signal for generating the predetermined torque in the motor 11 in the stopped state of the vehicle V, and brings the gears into a meshing state. The processing unit 301 generates the drive request signal for generating a sinusoidal torque having preset cycle and amplitude as the predetermined torque in the stopped state of the vehicle V, and brings the gears into the meshing state. The processing unit 301 outputs the generated drive request signal to the electronic control unit 1.

In S6, the electronic control unit 1 outputs the drive request signal received from the inspection apparatus 300 to the PDU 5, and the PDU 5 generates the predetermined torque in the motor 11 based on the drive request signal. The torque generated by the motor 11 is, for example, the torque as illustrated in the torque waveform 401 in FIG. 4.

In S7, the gears (DR and DN) of the transmission 12 are brought into the meshing state by the generation of the torque of the motor 11.

In S8, the processing unit 301 of the inspection apparatus 300 acquires a signal (AE signal) of the AE sensor 320 when the torque is applied. When the AE signal is received, the processing unit 301 updates inspection date and time information to be accumulated in the storage unit 303.

The processing unit 301 can identify whether the vehicle V stops at the target stop position before the update or stops at the updated target stop position based on a signal of the determination result of permission or non-permission acquired from the electronic control unit 1. The processing unit 301 updates inspection date and time information based on meshing information corresponding to the identified stop position. For example, when the vehicle stops at the target stop position 705 in FIG. 7, the processing unit 301 updates inspection date and time information in meshing information of DR8-DN48. When the vehicle stops at the updated stop target position 706, the processing unit 301 updates inspection date and time information in meshing information of DR10-DN50.

Note that, even in a case where a crack occurs in the gears during traveling, the AE signal is generated when the crack develops (propagates) by applying a predetermined torque to the gears during the inspection in the stopped state, and thus, the processing unit 301 can detect the occurrence of the crack.

In S9, the processing unit 301 determines whether the abrupt signal 403 (FIG. 4) as illustrated in FIG. 4 has occurred in meshing of the gears (DR and DN) as the inspection target. In a case where the abrupt signal is not detected (S9—NO) but the continuous high-frequency signal 404 (FIG. 4) is detected, the processing unit 301 determines to normality (S12) and ends the processing.

On the other hand, in a case where the abrupt signal 403 is detected in the determination of S9 (S9—YES), the processing unit 301 determines that peeling or cracking occurs in the meshing of the gears (DR and DN) as the inspection target (S10: abnormality determination).

In S11, the processing unit 301 outputs a notification signal to issue a notification about the occurrence of peeling or cracking to the electronic control unit 1.

When the notification signal is received, the electronic control unit 1 may generate a notification sound from the audio output device 6*b* such as a speaker. Alternatively, the electronic control unit 1 may turn on the display of the information display device 6*a* such as an indicator.

Specific Example of Processing in Step S1

Figure 9:
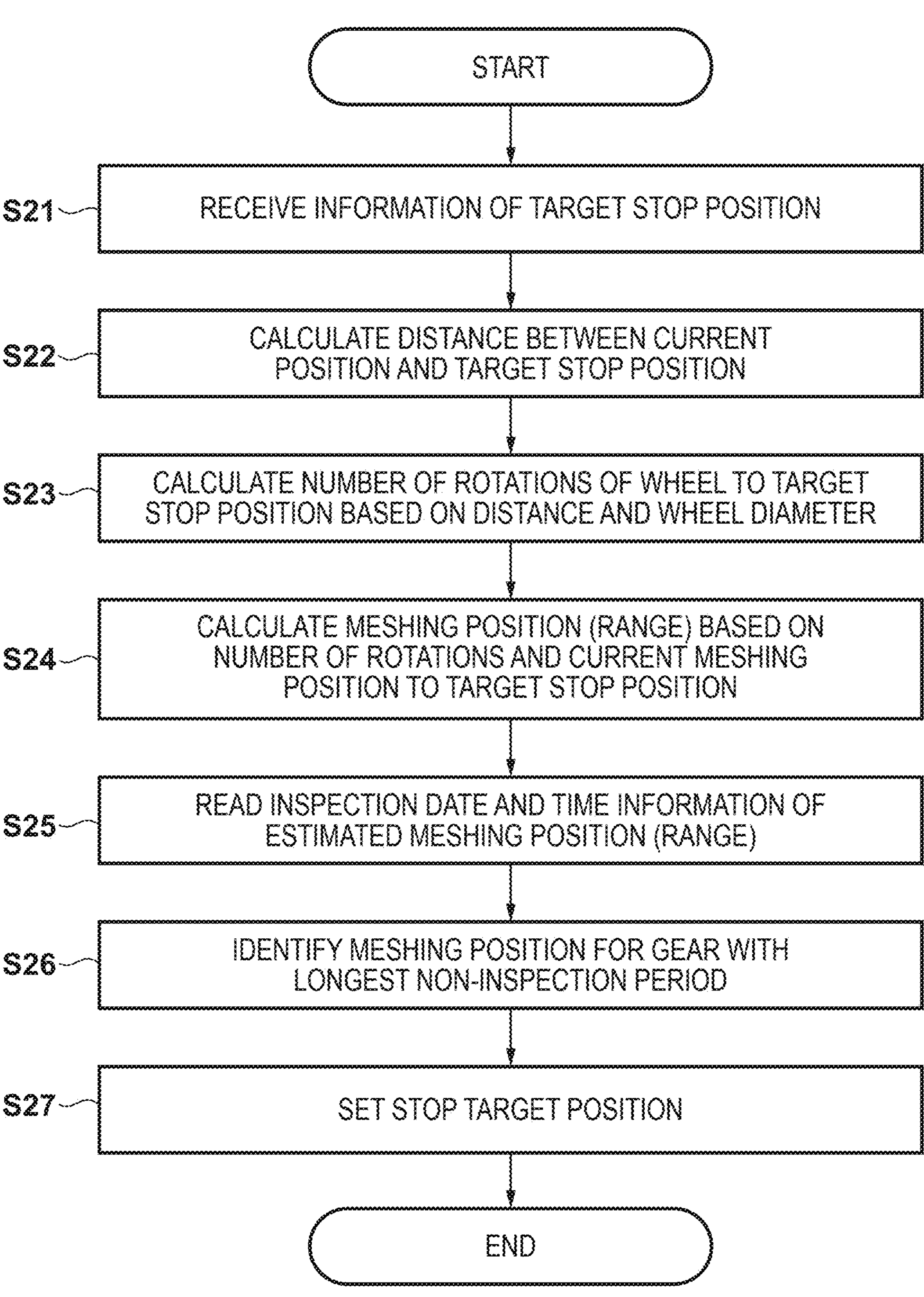
FIG. 9 is a view for describing a flow of specific processing in step S1 of FIG. 8.

A flow of specific processing in step S1 of FIG. 8 will be described with reference to a flowchart of FIG. 9. In S21, the electronic control unit 1 acquires information on a target stop position in automated driving control (for example, 705 in FIG. 7). As the information on the target stop position, a predetermined permitted range may be set in consideration of various factors in the automated driving control such as a change in information around the vehicle V during traveling.

In S22, the electronic control unit 1 calculates a distance from a current position to the target stop position. The electronic control unit 1 calculates the distance from a difference between the target stop position and the current position.

In S23, the electronic control unit 1 calculates a number of rotations of the wheels to the target stop position based on the calculated distance and a wheel diameter (tire diameter). The electronic control unit 1 calculates the number of rotations of the wheels from "distance/(2×wheel radius×π)".

Note that the wheel diameter (tire diameter: 2×wheel radius) may be a fixed value, or the wheel diameter (tire diameter) can be corrected depending on a wear amount of the wheel diameter (tire diameter) in consideration of travel history and mileage in the automated driving. Information on the wheel diameter and the wear amount of the wheel diameter (tire diameter) in consideration of the travel history and the mileage is stored in, for example, the database 7*d* (storage device), and the electronic control unit 1 calculates the number of rotations of the wheels with reference to the information in the database 7*d*. Alternatively, the electronic control unit 1 corrects the wheel diameter (tire diameter) with reference to the information in the database 7*d*, and calculates the number of rotations of the wheels.

In S24, the electronic control unit 1 calculates a meshing position (range) of teeth at the time of traveling to the target stop position from the calculated number of rotations and a current meshing position (meshing combination position) of teeth. The meshing position of teeth to be calculated is not limited to one meshing position, and for example, a range of several front and rear teeth may be acquired as meshing positions of teeth. The electronic control unit 1 outputs the calculated meshing position (range) of teeth to the inspection apparatus 300 as an estimated meshing position (range) in the automated driving control.

Next, in S25, the processing unit 301 of the inspection apparatus 300 reads inspection date and time information of a predetermined range (FIG. 7) from the storage unit 303 based on the estimated meshing position (range) calculated by the electronic control unit 1.

In S26, the processing unit 301 identifies a meshing combination (meshing position) of gears having the longest non-inspection period in the inspection date and time information in the predetermined range (for example, 706 in FIG. 7).

Then, in S27, the processing unit 301 sets the stop target position 706 based on the identified meshing combination of the gears.

The processing unit 301 updates a target stop position planned in the automated driving control of vehicle V such that vehicle V stops at the meshing position of the gears as a target of the inspection. For example, as illustrated in 706 of FIG. 7, the processing unit 301 identifies a meshing combination (DR10-DN50) of the gears having the longest non-inspection period, and sets a stop position of the vehicle V according to the meshing combination as the stop target position 706. The set stop target position 706 is the stop position obtained by updating the target stop position 705 in the automated driving control.

As described above in S1 of FIG. 8, the processing unit 301 transmits a stop position request (inspection request) for stopping the vehicle V at the set stop target position 706 to the electronic control unit 1.

Modifications

Note that the example in which the inspection date and time information is stored in the storage unit 303 has been described in the above embodiment, but information stored in the storage unit 303 is not limited to the inspection date and time information, and information on the number of inspections (number of evaluations) in each meshing combination may be stored together with the inspection date and time information.

When a plurality of pieces of meshing information are identified as combinations of gears having the longest non-inspection period, the processing unit 301 may identify meshing of gears having the smallest number of inspections as an inspection target based on the information on the number. For example, in a case where a plurality of pieces of meshing information (D1, D2, and D3) are identified as combinations of gears having the longest non-inspection period, the inspection apparatus 300 may preferentially inspect a combination (for example, D1) having the smallest number of inspections among the plurality of pieces of meshing information (D1, D2, and D3) with reference to the information on the number of inspections (number of evaluations) in the storage unit 303.

Further, a configuration example in which an inspection is performed when the vehicle Vis stopped has been described in the above embodiment, but an AE signal may be acquired to inspect a plurality of gears a plurality of times during traveling of the vehicle V.

Further, the number of the AE sensors 320 is not limited to one, and it is also possible to perform an inspection using information of a plurality of the AE sensors 320. For example, when temporal difference information until the processing unit 301 acquires a signal from each of the AE sensors 320 is set for each of the AE sensors 320, it is possible to determine which AE sensor 320 has detected the abrupt signal 403. As a result, it is possible to determine presence or absence of damage on a gear basis for a plurality of gears included in the transmission 12.

Summary of Embodiment

The above embodiment discloses at least the following inspection apparatus and inspection method.

Configuration 1. An inspection apparatus (for example 300) configured to inspect damage on gears in a transmission (for example 12) that transmits a torque generated by a motor (for example 11) mounted as a drive source of a vehicle (for example V), the inspection apparatus comprising:

a sensor (for example 320) configured to detect an AE signal in a meshing state of the gears; and a processor (for example 301) configured to determine presence or absence of occurrence of damage in the meshing state of the gears based on the AE signal.

According to the inspection apparatus of Configuration 1, it is possible to inspect the presence or absence of occurrence of damage in the meshing state of the gears in a state where the motor is mounted on the vehicle.

Configuration 2. The processor (301) is configured to generate a drive request signal for causing the motor to generate a predetermined torque in a stopped state of the vehicle, and to bring the gears into the meshing state.

According to the inspection apparatus of Configuration 2, there is no possibility that a torque is applied by the intervention of a driver in the stopped state of the vehicle, and thus, the inspection can be performed in a stable state while reducing variations in an inspection condition.

Configuration 3. The processor (301) is configured to update a target stop position in such a manner that the vehicle stops at a meshing position of the gears as a target of the inspection, the target stop position being planned in automated driving control of the vehicle.

Configuration 4. The inspection apparatus (300) further comprising a memory (for example 303) configured to store inspection date and time information based on the AE signal, wherein the processor (301) is configured to identify, as a target of the inspection, meshing of the gears having a longest non-inspection period from a previous inspection time point in the inspection date and time information.

Configuration 5. The processor (301) is configured to identify, as the target of the inspection, the meshing of the gears having the longest non-inspection period in meshing information in a predetermined range acquired with a meshing position at a target stop position planned in automated driving control of the vehicle as a reference.

When the inspection is performed in the stopped state, meshing of teeth of gears (DR and DN) as the target of the inspection may be several teeth. Therefore, according to the inspection apparatus of Configurations 3 to 5, a stop position of the vehicle Vis controlled in cooperation with the automated driving control of the vehicle V, and the meshing of the gears having the longest non-inspection period from the previous inspection time point is preferentially inspected, so that the damage in the gears can be detected early.

Configuration 6. The processor (301) is configured to determine the presence or absence of occurrence of the damage based on a waveform of the AE signal.

Configuration 7. The processor (301) is configured to generate a drive request signal for generating a sinusoidal torque having preset cycle and amplitude as the predetermined torque in the stopped state of the vehicle, and to bring the gears into the meshing state.

According to the inspection apparatus of Configurations 6 and 7, the AE signal is likely to be generated due to minor degradation that occurs before an object is completely damaged, and thus, enables early detection of gear degradation.

Configuration 8. The memory (303) is configured to store information on a number of inspections together with the inspection date and time information, and the processor (301) is configured to identify, when a plurality of pieces of meshing information are identified as combinations of the gears having the longest non-inspection period, meshing of the gears for which the number of inspections is smallest as the target of the inspection based on the information on the number.

According to the inspection apparatus of Configuration 8, even when the target of the inspection cannot be identified based on the inspection date and time information, the target of the inspection can be identified using the inspection date and time information and the information on the number.

Configuration 9. The processor (301) is configured to output a notification signal to issue a notification about the occurrence of the damage based on the determination.

According to the inspection apparatus of Configuration 9, it is possible to notify a driver of an initial stage of the gear degradation early.

Configuration 10. An inspection method of an inspection apparatus (300), configured to inspect damage of gears in a transmission (12) that transmits a torque generated by a motor (11) mounted as a drive source of a vehicle (V), the inspection method comprising:

detecting, by a sensor (320) of the inspection apparatus (300), an AE signal in a meshing state of the gears; and determining, by a processor (301) of the inspection apparatus (300), presence or absence of occurrence of damage in the meshing state of the gears based on the AE signal.

According to the inspection method of Configuration 10, it is possible to inspect the presence or absence of occurrence of damage in the meshing state of the gears in the state where the motor is mounted on the vehicle.

OTHER EMBODIMENTS

In the present invention, it is also possible to supply a program for realizing the functions of the above-described embodiment to a system or an inspection apparatus constituting the system via a network or a storage medium, and one or more processors in a computer of the inspection apparatus can read the program to execute processing of the inspection apparatus.

The invention is not limited to the foregoing embodiments, and various variations/changes are possible within the spirit of the invention.

What is claimed is:

1. An inspection apparatus configured to inspect damage on gears in a transmission that transmits a torque generated by a motor mounted as a drive source of a vehicle, the inspection apparatus comprising:

a sensor configured to detect an acoustic emission (AE) signal in a meshing state of the gears;

a processor configured to determine presence or absence of occurrence of damage in the meshing state of the gears based on the AE signal; and a memory configured to store inspection date and time information based on the AE signal, wherein the processor is configured to identify, as a target of the inspection, meshing of the gears having a longest non-inspection period from a previous inspection time point in the inspection date and time information, and the processor is configured to identify, as the target of the inspection, the meshing of the gears having the longest non-inspection period in meshing information in a predetermined range acquired with a meshing position at a target stop position planned in an automated driving control of the vehicle as a reference.

2. The inspection apparatus according to claim 1, wherein the processor is configured to generate a drive request signal for causing the motor to generate a predetermined torque in a stopped state of the vehicle, and to bring the gears into the meshing state.

3. The inspection apparatus according to claim 1, wherein the processor is configured to update a target stop position in such a manner that the vehicle stops at a meshing position of the gears as a target of the inspection, the target stop position being planned in the automated driving control of the vehicle.

4. The inspection apparatus according to claim 1, wherein the processor is configured to determine the presence or absence of occurrence of the damage based on a waveform of the AE signal.

5. The inspection apparatus according to claim 2, wherein the processor is configured to generate a drive request signal for generating a sinusoidal torque having preset cycle and amplitude as the predetermined torque in the stopped state of the vehicle, and to bring the gears into the meshing state.

6. The inspection apparatus according to claim 1, wherein the memory is configured to store information on a number of inspections together with the inspection date and time information, and the processor is configured to identify, when a plurality of pieces of meshing information are identified as combinations of the gears having the longest non-inspection period, meshing of the gears for which the number of inspections is smallest as the target of the inspection based on the information on the number.

7. The inspection apparatus according to claim 1, wherein the processor is configured to output a notification signal to issue a notification about the occurrence of the damage based on the determination.

8. An inspection method of an inspection apparatus, configured to inspect damage of gears in a transmission that transmits a torque generated by a motor mounted as a drive source of a vehicle, the inspection method comprising:

detecting, by a sensor of the inspection apparatus, an acoustic emission (AE) signal in a meshing state of the gears;

determining, by a processor of the inspection apparatus, presence or absence of occurrence of damage in the meshing state of the gears based on the AE signal; and storing, in a memory, inspection date and time information based on the AE signal, wherein the processor is configured to identify, as a target of the inspection, meshing of the gears having a longest non-inspection period from a previous inspection time point in the inspection date and time information, and the processor is configured to identify, as the target of the inspection, the meshing of the gears having the longest non-inspection period in meshing information in a predetermined range acquired with a meshing position at a target stop position planned in an automated driving control of the vehicle as a reference.

* * * * *